(12) United States Patent
Tonkin et al.

(10) Patent No.: US 7,611,792 B2
(45) Date of Patent: Nov. 3, 2009

(54) HUMIDIFYING GAS INDUCTION OR SUPPLY SYSTEM

(75) Inventors: Mark Christopher Tonkin, The Barn (GB); Mark Andrew Young, Hemel Hempstead (GB); Mark Elden Schuchardt, Pleasant Ridge, MI (US)

(73) Assignee: Design Technology and Innovation Ltd., Surrey (GB)

( * ) Notice: Subject to any disclaimer, the term of this patent is extended or adjusted under 35 U.S.C. 154(b) by 521 days.

(21) Appl. No.: 10/253,246

(22) Filed: Sep. 24, 2002

(65) Prior Publication Data

US 2003/0025219 A1 Feb. 6, 2003

Related U.S. Application Data

(62) Division of application No. 09/369,803, filed on Aug. 6, 1999, now Pat. No. 6,511,052.

(51) Int. Cl.
*H01M 8/04* (2006.01)
*B01D 47/00* (2006.01)

(52) U.S. Cl. .......................... 429/34; 429/12; 261/101
(58) Field of Classification Search .............. 429/34
See application file for complete search history.

(56) References Cited

U.S. PATENT DOCUMENTS

| 4,289,508 A | 9/1981 | Robert |
| 4,398,506 A | 8/1983 | Cosway |
| 4,800,848 A | 1/1989 | Hubbard |
| 4,818,637 A | 4/1989 | Molter et al. .............. 429/15 |
| 4,973,530 A | 11/1990 | Vanderborgh et al. ......... 429/13 |
| 5,200,278 A | 4/1993 | Watkins et al. ................ 429/24 |
| 5,662,878 A * | 9/1997 | Datta et al. |

(Continued)

FOREIGN PATENT DOCUMENTS

DE 196 54 977 A1 6/1998

(Continued)

OTHER PUBLICATIONS

Patent Abstract of Japan vol. 015, No. 232, Jun. 13, 1991, JP 03 070848 Miyazawa Takeo.

*Primary Examiner*—John S Maples
(74) *Attorney, Agent, or Firm*—Ohlandt, Greeley, Ruggiero & Perle, L.L.P.

(57) ABSTRACT

Water vapor is introduced into an inlet air stream (16) of an engine (12), for example, by a pervaporation process through a non-porous hydrophilic membrane (18). A water reservoir (20), which can contain contaminated water, provides a vapor pressure gradient across the hydrophilic membrane (18) into the inlet air stream (16), while the rate of delivery of the water vapor to a cylinder (38-40) is self-regulated by the rate of flow of air across the membrane. The hydrophilic membrane (18) therefore also filters the water from the water reservoir (20) to an extent that pure water vapor is provided to the air inlet stream (16). Delivery of water vapor can nevertheless be controlled using a hood (26) that slides over the hydrophilic membrane to limit its exposed surface area. Alternatively, water vapor is introduced into one or more of the gas streams of a fuel cell by separating the gas stream from the wet exhaust gas stream by a hydrophilic membrane such that moisture passes across the membrane to moisten the gas stream and thereby prevent drying out of the proton exchange membrane.

10 Claims, 3 Drawing Sheets

U.S. PATENT DOCUMENTS 6,015,633 A * 1/2000 Carlstrom et al. ............. 429/13
6,106,965 A * 8/2000 Hirano et al. ................. 429/30
6,528,198 B1 * 3/2003 Jones et al. .................... 429/38

FOREIGN PATENT DOCUMENTS

| EP | 831 543 A1 | 3/1998 |
|---|---|---|
| GB | 2 139 110 A1 | 11/1984 |
| RU | 290598 | 4/1971 |
| WO | WO 96/24958 A1 | 8/1996 |

* cited by examiner

HUMIDIFYING GAS INDUCTION OR SUPPLY SYSTEM

CROSS REFERENCE TO RELATED APPLICATIONS

This application is a divisional of application Ser. No. 09/369,803, filed 6 Aug. 1999, now U.S. Pat. No. 6,511,052.

BACKGROUND TO THE INVENTION

This invention relates, in general, to humidifying gas induction or supply systems and particularly, but not exclusively, to a humidifying air induction or supply system of an internal combustion engine and a humidifying gas induction or supply system for a fuel cell.

SUMMARY OF THE PRIOR ART

In energy conversion systems in general, a fuel and an oxidant are combined to provide energy. In this process, chemical energy is converted into kinetic energy or electricity, as well as heat.

In internal combustion engines, including two-stroke, four-stroke, rotary and diesel motors for example, fuel-air mixtures are burnt to provide this chemical energy. Prior to combustion, the fuel may be dispersed into the induction air stream by means of direct injectors or by a carburetor, and the combustion itself may be triggered by an electrical spark, a glow-wire or simply by the heat of compression of the fuel-air mixture. In all internal combustion engines, the sudden increase in pressure caused by burning a fuel-air mixture in the combustion chamber causes parts of the engine to move, so imparting kinetic energy to the vehicle powered by the engine.

Many factors control the efficiency with which chemical energy is converted into useful kinetic energy or electricity, while minimizing the non-productive heat that is always produced alongside. Key variables for maximizing the efficiency of an internal combustion engine include maximizing the pressure built up during the combustion process and minimizing the temperatures of the induction air and the combustion chamber. A cooler-burning engine also offers the environmental advantage of a reduction in the amount of nitrogen oxides emitted as a by-product by the reaction of atmospheric nitrogen with oxygen species during the combustion process.

In addition to fuel and air, chemically inert materials may be introduced into the combustion chamber to absorb heat and generate pressure, thus meeting both of the above requirements for optimizing engine efficiency. In particular, water may be used to fulfil this function.

It is known that the automotive industry, for example, has previously used a selective water-injection cooling system for engine cylinders. However, the complexity of such a system and the high cost of its implementation have conspired to outweigh the benefits obtained by the process for large-scale commercialization. More specifically, water injection systems to engine cylinders have previously demanded energy input, precise control and high operating pressures, with any one of these requirements itself placing a significant constraint on potential implementation.

Other gas induction or supply systems in which humidification is of value include fuel cells, in particular proton exchange membrane (PEM) fuel cells in which gases are constantly passed over a membrane that must be kept damp for optimum performance. Humidification of circulated air in greenhouses may also be contemplated by use of the following invention.

SUMMARY OF THE INVENTION

According to a first aspect of the present invention there is provided a humidifying gas induction or supply system comprising a hydrophilic membrane surface.

Preferably, the humidifying gas induction or supply system further comprises a water reservoir integrally formed with the hydrophilic membrane surface.

A hood may be arranged to regulate an area of hydrophilic membrane surface exposed to one of the water reservoir and the gas induction or supply system.

In another aspect of the present invention there is provided an engine comprising a humidifying air induction or supply system having a hydrophilic membrane surface.

Preferably, the engine further comprises a water reservoir integrally coupled with the hydrophilic membrane surface.

In a further aspect of the present invention there is provided a motorized vehicle containing a humidifying air induction or supply system having a hydrophilic membrane surface.

Preferably, the motorized vehicle further comprises a water reservoir coupled to the hydrophilic membrane surface.

A hood may be arranged to regulate an area of hydrophilic membrane surface exposed to one of the water reservoir and the air induction system.

An exhaust system from the engine expels exhaust gases from the internal combustion process, and these exhaust gases may be used by a heat-exchanging coil in the water reservoir to heat the water contained in the water reservoir.

In another embodiment, the motorized vehicle further comprises: a fuel tank having a hydrophilic membrane surface across which water vapor pervaporates; and a channel juxtaposed the hydrophilic membrane and coupled to the water reservoir, the channel providing either a condensation trap for water vapor pervaporated from the fuel tank, and wherein the channel is coupled to the water reservoir, or a means of directing the water vapor released by the hydrophilic membrane directly into the incoming air stream. However, use of the membrane to bleed water from a fuel tank may also be actioned independently within a separate system.

Advantageously, the present invention allows the selective augmentation of water vapor into an air induction system, such as within an engine of a car, that is achieved easily (in terms of mechanical and control simplicity) and at relatively (if not insignificantly) low cost. Indeed, the inclusion of the system of the present invention is extremely desirable because it limits pollution emissions from car engines (and the like) while also improving efficiency and performance of such engines.

In a yet further aspect of the present invention, there is provided a fuel cell comprising a humidifying gas induction or supply system having a hydrophilic membrane surface.

Advantageously the current invention allows the addition of water vapor to one or more of the gas streams of a fuel cell particularly in proton exchange membrane fuel cells, preventing the proton exchange membrane from drying out and therefore optimizing the fuel cell performance.

Normal tap water or other sources of water (rather than expensive distilled water) can be used within the systems of the invention, since the hydrophilic membrane removes corrosive and damaging impurities. Furthermore, the constant delivery of water vapor into the induction air flow of an engine system avoids all problems associated with the immiscibility of water and automotive fuels, and also corrosion problems associated with the presence of liquid water; and the constant delivery of water vapor into one or more of the gases of a fuel cell optimizes performance by preventing the proton exchange membrane from drying out.

BRIEF DESCRIPTION OF THE DRAWINGS

Exemplary embodiments of the present invention will now be described with reference to the accompanying drawings, in which:

FIG. 1 is a schematic diagram of a preferred humidifying air intake system according to the present invention, the air intake system shown in the context of an engine of a motorized vehicle or the like.

DETAILED DESCRIPTIONS OF PREFERRED EMBODIMENTS

It has been recognized that engines of cars, for example, develop more power at a nominal revolution rate on damp mornings, with this increase arising as a consequence of dampness in the air. The present invention has identified that there are, in fact, significant advantages and benefits derived from injecting water (in the form of water vapor) into the cylinders of an engine, for example. For example, limited amounts of water vapor in the cylinder during compression and ignition produces an increased compression ratio without suffering the detrimental effects of "pinking" or "knocking". Furthermore, in relation to the overall combustion process within the cylinder, the water vapor cleans the combustion chamber and improves fuel burn (by changing the vapor density and heat capacity of the fuel-air mixture), thereby resulting in lower emissions. Additionally, the presence of water vapor in the combustion chamber has a cooling effect that cools the burn. In other words, the high latent heat of vaporization of water causes the engine to run cooler and this therefore results in the lubricants working in a more efficient manner. Also, with the inclusion of water vapor in cylinders, an improvement in fuel consumption is experienced.

Figure 1:
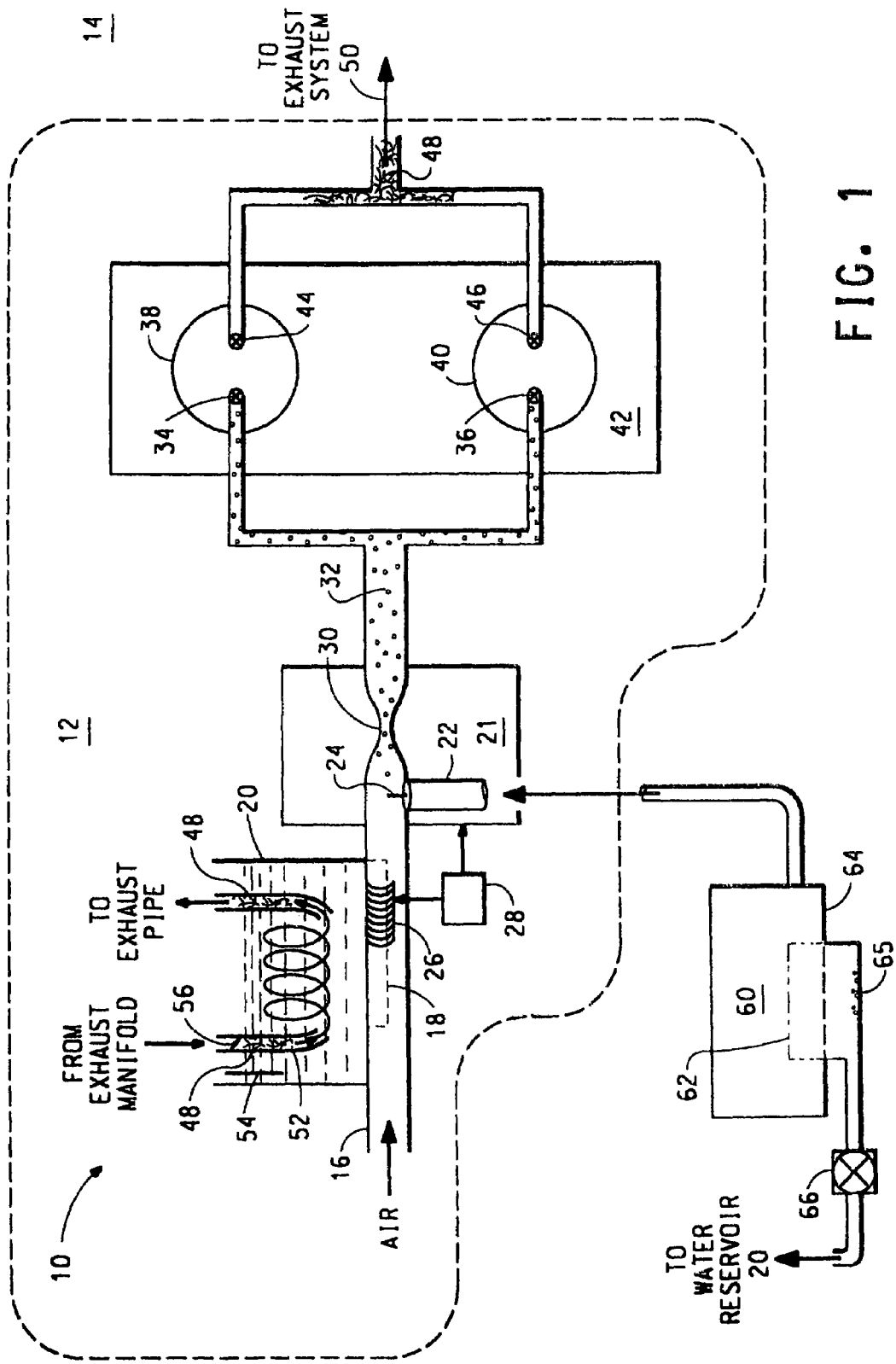

Turning to FIG. 1, a schematic diagram of a preferred humidifying air induction (or intake) system 10 according to the present invention is shown. The air induction system is, in fact, shown in the context of an engine 12 of a motorized vehicle 14 or the like, although the air induction system could equally well be employed in any other system requiring augmentation of humidity.

An air inlet network or manifold 16, typically located after an air filter (not shown), contains a hydrophilic membrane surface 18 that separates a water reservoir 20 from the air inlet network 16. The air inlet network 16 is coupled to a carburetor 21 containing a fuel feed 22 incorporating a conventional needle valve 24 (the carburetor may, of course, be replaced by any conventional fuel delivery system, for example a fuel injection system or the like). The hydrophilic membrane surface 18 may be surrounded by a throttle (or hood/cowling) 26 that regulates the area of hydrophilic membrane surface 18 exposed either to the air inlet network 16 or the water reservoir 20. The throttle 26 can be mechanically controlled, although in relation to an engine for a car it is more likely to be regulated by a microprocessor 28. As previously described, the carburetor 21 includes a Venturi tube configuration 30, which increases the velocity of air and encourages vaporization of hydrocarbon fuel from the fuel feed 22. A fuel-air mixture 32 is then feed to inlet valves 34-36 in respective cylinder heads 38-40 of an engine cylinder block 42. For the sake of simplicity, a two-cylinder engine is shown by way of example in FIG. 1.

Of course, the water reservoir 20 could be remote from the hydrophilic membrane, with only a feed pipe effectively providing a supply of water to the surface of the hydrophilic membrane remote from any air pipe/inlet.

The surface of the hydrophilic membrane may be of any desired shape and may be corrugated or flat, with the shape contributing to a maximum throughput of pervaporate from the water reservoir. As will be appreciated, it is generally the rate at which water vapor is removed from the surface of the membrane (and the vapor pressure gradient across the membrane) that determines the rate of pervaporation. Therefore, even when the engine is not operating, some pervaporation takes place but this is negligible and has no effect in view of there being no air movement within the air intake system and the residual humidity within this form of open system.

Following the various stages of cylinder operation (such as induction, compression, ignition and expulsion), an outlet valve 44-46 associated with each cylinder 38-40 opens to expel exhaust gases (and to some lesser extent unburnt fuel) 48 to an exhaust system 50 of the motorized vehicle 14. The exhaust system 50 may, optionally, feed into a heat exchanging coil 52 located in the water reservoir 20, with the temperature of water in the water reservoir 20 increased by the hot exhaust gases. This is beneficial in two ways, first, the exhaust gases are rendered relatively cooler (and hence less environmentally damaging) and second, the raised water temperature increases the rate of the pervaporation process through the hydrophilic membrane surface 18. Once the exhaust gases 48 have passed through the heat exchanging coil 52 they are ejected from the motorized vehicle 14 (after additional cleaning in a catalytic converter, for example) via an exhaust pipe.

Since the temperature of the water in the water reservoir should generally be limited to a specific operating range, a thermometer (or the like) 54 provides temperature sensing information to the microprocessor 28, with the microprocessor therefore able to regulate heating of the water with the opening and closing of a valve and by-pass system 56. Alternatively or additionally, the temperature of the water in the water reservoir may be adjusted by means of conventional heating arrangements, for example, a microprocessor controlled heating coil. If high temperatures (e.g. 60.degree. C. or higher) are expected to be reached in the water reservoir, it may be necessary to provide a support structure for the hydrophilic membrane surface 18 as the membrane may soften or deform if it is not supported, although this will, of course, depend upon the hydrophilic membrane materials selected.

During operation, water vapor pervaporates through the hydrophilic membrane surface 18 and enters the air inlet stream. As the engines runs faster, requiring an increased piston movement rate in each cylinder, the amount of water vapor taken from the surface of the membrane increases accordingly, i.e. the system is self regulating according to air intake requirements, although the throttle 26 may further regulate the amount of water vapor that is provided from the water reservoir 20.

Preferably, the water reservoir 20 is located within the engine at a position such that should puncturing of the hydrophilic membrane occur, then water stored therein does not enter the engine. In such a situation, a loss of performance of the engine will inevitably result (in the same way as if the water reservoir were to run dry), but no damage should be sustained by the engine. Clearly, should the water level in the water reservoir 20 become low, then the microprocessor 28 could alert the driver.

A further aspect that can complement or work independently of the system of FIG. 1 involves the removal of water from a fuel tank 60 that feeds the carburetor 21. The fuel tank 60 includes a hydrophilic membrane surface 62 that, preferably, is located in a floor 64 of the fuel tank 60. With hydrocarbon fuel being lighter than water, any water present in the fuel tank can therefore be purged from the fuel tank 60 via a pervaporation process. Water vapor passing through the membrane 62 may be passed directly back into the air inlet stream either by pumping or because the fuel tank 60 may be positioned so that the membrane 62 delivers pervaporated water vapor directly into the air inlet 16. Alternatively, the water vapor may be condensed to liquid water 65 and collected in a channel 16 that is coupled to the water reservoir 20 via a pump 16. Such a system is particularly beneficial in relation to diesel engines, especially in a marine environment, with non-protected diesel engines otherwise susceptible to malfunction when water has entered the diesel tank and has frozen. In this embodiment of the invention, it will, of course, be necessary to select the materials from which the hydrophilic membrane surface 62 is constructed carefully so that the structure is not damaged by long term contact with the fuel and also so that substantially none (or at least an insignificant amount) of the fuel (or components thereof) is transmitted across the membrane surface 62 into the induction air stream or the water reservoir 20.

In summary, the hydrophilic membrane 18 is used to spatially separate liquid water (including tap water and other forms of contaminated water having organic or inorganic salts, suspensions or emulsions) from an air volume inducted into an internal combustion engine 12 or the like. The hydrophilic membrane acts to filter this liquid water so that only pure water pervaporates through the hydrophilic membrane. This pure water vapor is then continuously delivered into the induction air stream of the engine. The amount of pure water vapor delivered into the air stream is self-regulating, with more being delivered when the air stream moves across the hydrophilic membrane at a faster rate.

In a second embodiment of the invention there is provided a fuel cell comprising a humidifying gas induction or supply system having a hydrophilic membrane, particularly a proton exchange membrane fuel cell.

Proton exchange membrane fuel cells function by combining hydrogen and atmospheric or pure oxygen with the aid of a catalyst, generating useful electricity and water as a by-product across a proton exchange membrane and over a catalyst. Hydrogen functions as the anode and atmospheric or pure oxygen as the cathode. The current carrier that flows across the proton exchange membrane for the process of generating electricity is in the form of protons. For the proton exchange membrane to function effectively, it needs to be kept moist, because water is needed to transport these protons across it (as $H_3O^+$, rather than $H^+$) and so generate a current. Therefore, the higher the relative humidity of the induction gases into a fuel cell, the greater the efficiency of this energy conversion device in producing electricity.

Humidification of the proton exchange membrane is achieved by humidifying the induction hydrogen gas stream, and optionally by also humidifying the induction air or oxygen gas streams. The humidification of hydrogen and air or oxygen induction streams may be performed by recirculating the water generated as a by-production of the operation of the fuel cell, or additional water may be used separately.

Hydrogen gas in particular is normally available in compressed form in gas bottles and contains very little moisture. The air or oxygen used as the other induction gas stream may also need to be humidified; depending on their initial water content. As the induction gas flows of hydrogen and air or oxygen are increased to generate more and more electricity, humidification of the hydrogen in particular become more and more difficult, leading to a reduction in the efficiency of the fuel cell at higher power density.

Existing methods of humidification of the induction gas streams use expensive membrane materials and are complicated, so there is a critical need for an effective humidification system at low cost.

An additional embodiment of this invention is therefore given by the use of hydrophilic membranes to separate the induction, dry gas streams, both hydrogen and oxygen or air, from the wet, oxygen-depleted air exhaust gas stream, so that water may pervaporate through the hydrophilic membrane from the wet exhaust air into the dry induction hydrogen and air or oxygen streams. The self-regulating function of hydrophilic membranes allows more water to pervaporate through the membrane when there is a high gas flow, which is precisely what is required.

Figure 2:
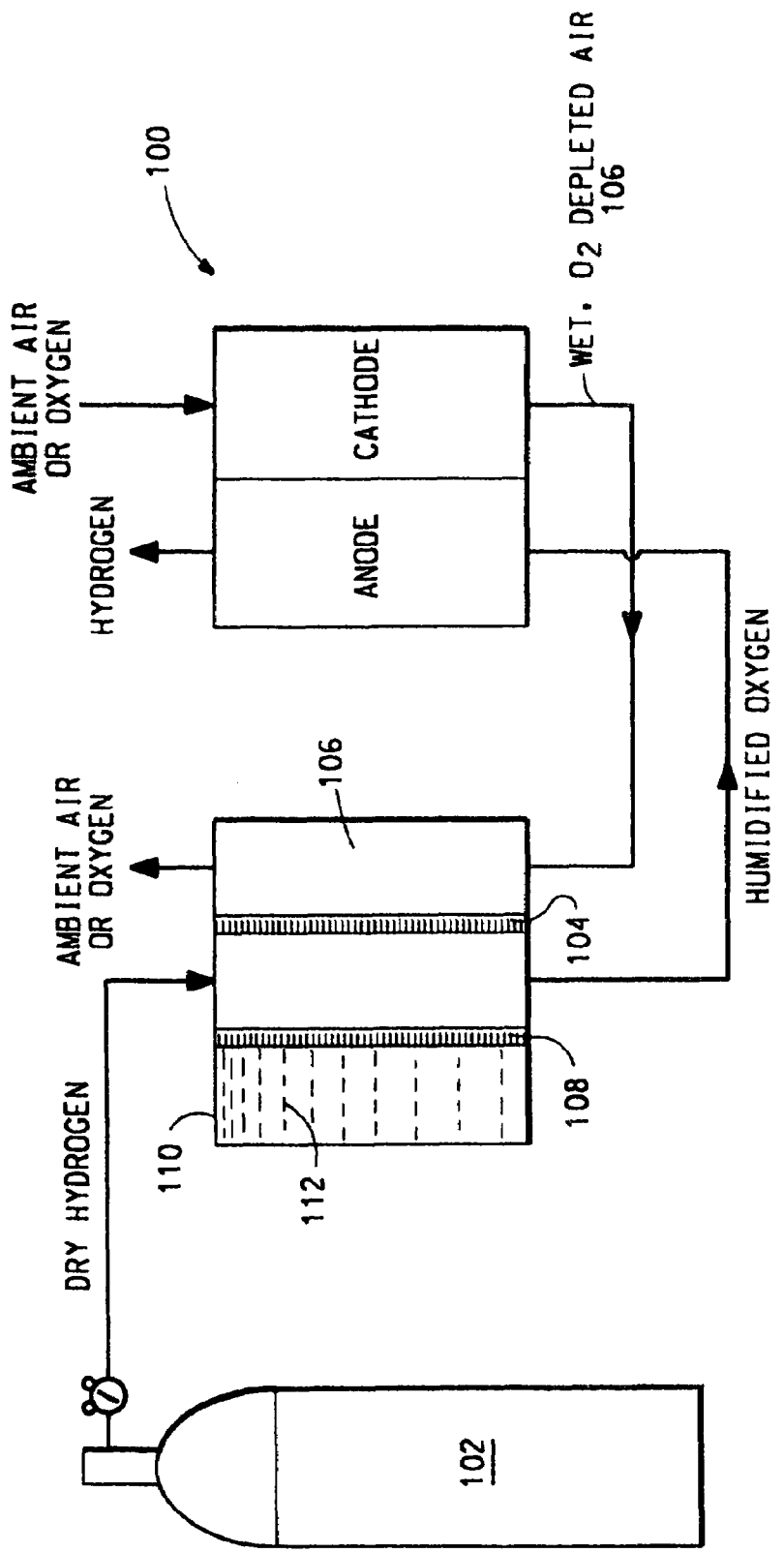
FIG. 2 is a schematic diagram of a preferred humidifying gas induction or supply system shown in the context of a proton exchange membrane fuel cell.

FIG. 2 shows a schematic view of a fuel cell 100, where the dry hydrogen gas stream 102 is humidified by being in contact with a hydrophilic membrane 104 which is contacted, on the other face, with the wet exhaust air 106. Water will therefore pervaporate across the hydrophilic membrane 104 and humidify the hydrogen gas stream 102 before it reaches the fuel cell.

Optionally, an additional hydrophilic membrane 108 may be used, separating the hydrogen gas stream 102 from a container 110 filled with liquid water 112. Should the humidity from the exhaust air stream not be sufficient for the humidification of the hydrogen gas stream, more water may be provided by pervaporation through the hydrophilic membrane 108 in this optional additional arrangement.

Figure 3:
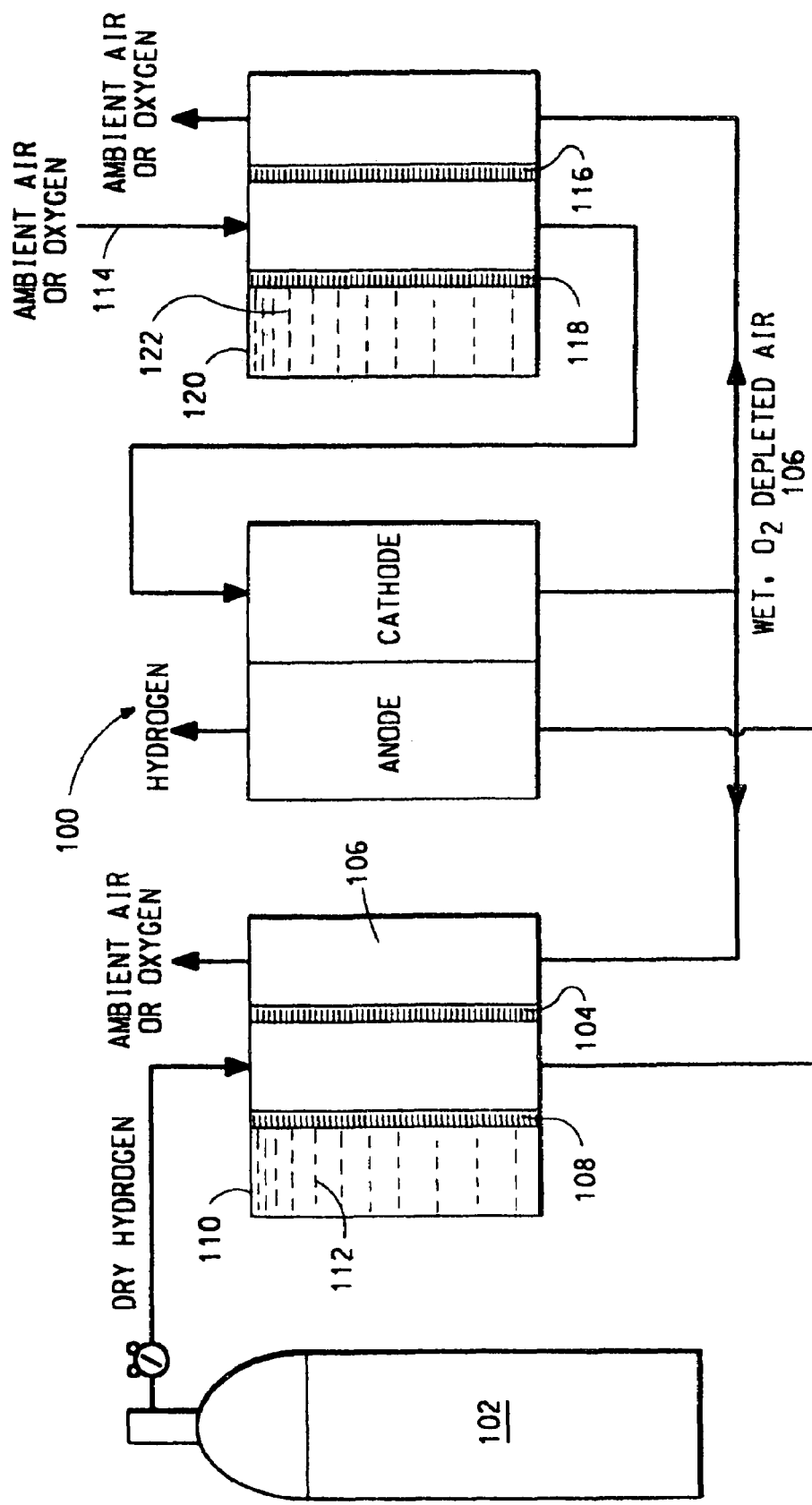
FIG. 3 is a schematic diagram of the proton exchange membrane fuel cell of FIG. 2 incorporating a further humidifying gas induction or supply system.

FIG. 3 shows a schematic view of a further embodiment of the fuel cell of the invention, where not only the dry hydrogen gas stream 102 is humidified but also the air or oxygen gas stream 114. In a similar manner to the way in which the hydrogen gas stream 102 is humidified, the air or oxygen gas stream 114 is in contact with a hydrophilic membrane 116, which is contacted, on the other face, with the wet exhaust air 106. Water will therefore pervaporate across the hydrophilic membrane 116 and humidify the air or oxygen gas stream 114 before it reaches the fuel cell 100.

As shown in FIG. 3, an optional additional hydrophilic membrane 118 may also be used, separating the air or oxygen gas stream 114 from a container 120 filled with liquid water 122. Should the humidity from the exhaust air stream not be sufficient for the humidification of the air or oxygen gas stream 114, more water may be provided by pervaporation through the hydrophilic membrane 118 in this optional additional arrangement.

The amount of water released from the optional additional hydrophilic membranes (108 and 118) may optionally be controlled, for example, by heating the water in the associated containers (110 and 120) or by providing a hood arranged to regulate the area of hydrophilic membrane surface exposed to the induction hydrogen, oxygen or air streams.

Optionally, the hydrophilic membranes 18, 104, 108, 116, 118 in an embodiment of the invention may be shaped to ensure a maximum surface area in contact with induction gas in a minimal space (e.g. fluted or convoluted shapes).

In the context of the disclosure, hydrophilic membranes for use in the humidifying gas induction or supply system of the present invention may be made from hydrophilic polymers. The term "hydrophilic polymer" means a polymer that absorbs water when in contact with liquid water at room temperature according to International Standards Organization specification ISO 62 (equivalent to the American Society for Testing and Materials specification ASTM D 570).

The hydrophilic polymer can be one or a blend of several polymers. For example, the hydrophilic polymer could be a copolyetherester elastomer or a mixture of two or more copolyetherester elastomers, such as polymers available from E.I. du Pont de Nemours and Company under the trade name HYTREL®. Alternatively, the hydrophilic polymer could be polyether-block polyamide or a mixture of two or more polyether-block polyamides, such as the polymers from Elf-Atochem Company of Paris, France available under the name PEBAX™. Other hydrophilic polymers include polyether urethanes or a mixture thereof, homopolymers or copolymers of polyvinyl alcohol and mixtures thereof. The above list is not considered to be exhaustive, but merely exemplary of possible choices of hydrophilic polymers.

A particularly preferred polymer for water vapor transmission in this invention is a copolyetherester elastomer or mixture of two or more copolyetherester elastomers having a multiplicity of recurring long-chain ester units and short-chain ester units joined through ester linkages, said long-chain ester units being represented by the formula:

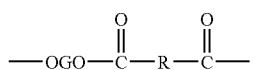

(I)

and said short-chain ester units are represented by the formula:

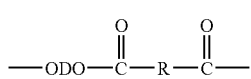

(II)

wherein:
a) G is a divalent radical remaining after removal of terminal hydroxyl groups from a poly(alkylene oxide)glycol having an average molecular weight of about 400-4000;
b) R is a divalent radical remaining after removal of carboxyl groups from a dicarboxylic acid having a molecular weight less than about 300;
c) D is a divalent radical remaining after removal of hydroxyl groups from a diol having a molecular weight less than about 250; optionally
d) the copolyetherester contains 0-68 weight percent, based on the total weight of the copolyetherester, ethylene oxide groups incorporated in the long-chain ester units of the copolyetherester;
e) the copolyetherester contains about 25-80 weight percent short-chain ester units.

The preferred polymer film is suitable for fabricating into thin but strong membranes, films and coatings. The preferred polymer, copolyetherester elastomer and methods of making it are known in the art, such as disclosed in U.S. Pat. No. 4,725,481 for a copolyetherester elastomer with a WVTR of 3500 g/m.sup.2/24 hr, or U.S. Pat. No. 4,769,273 for a copolyetherester elastomer with a WVTR of 400-2500 g/m.sup.2/24 hr.

The use of commercially available hydrophilic polymers as membranes is possible in the context of the present invention, although it is clearly preferable to have as high a WVTR as possible so as to minimize the surface area of hydrophilic membrane necessary to provide a given amount of water in the gas intake. Most preferably, the present invention uses commercially available membranes that yield a WVTR of more than 3500 g/m.sup.2/24 hr, measured on a film of thickness 25 microns using air at 23.degree. C. and 50% relative humidity at a velocity of 3 ms.sup.−1.

The polymer can be compounded with antioxidant stabilizers, ultraviolet stabilizers, hydrolysis stabilizers, dyes, pigments, fillers, anti-microbial reagents and the like.

A useful and well-established way to make membranes in the form of films is by melt extrusion of the polymer on a commercial extrusion line. Briefly, this entails heating the polymer to a temperature above its melting point and extruding it through a flat or annular die and then casting a film using a roller system or blowing the film from the melt. Support materials may be used in constructing the membrane and can include woven, non-woven or bonded papers, fabrics and screens and inorganic polymers stable to moisture, such as polyethylene, polypropylene, fiberglass and the like. The support material both increases strength and protects the membrane.

The support material may be disposed on only one side of the hydrophilic polymer membrane, or on both sides. When disposed on only one side, the support material can be in contact with the water or away from it.

Without being bound by any particular theory, it is believed that the purifying effect of the hydrophilic membrane, realized either in the form of a coating or an unsupported membrane, when in contact with water that may contain suspended or dissolved impurities, solids and emulsions, occurs because highly dipolar molecules, such as water, are preferentially absorbed and transported across the membrane or coating, compared to ions, such as sodium and chloride. When, in addition, a vapor pressure gradient exists across the membrane, water is released from the side not in contact with the source of water.

In relation to the hydrophilic membranes used in the preferred embodiments of the present invention, the water transmission characteristics are generally determined using standard test procedure ASTM E96-95-Procedure BW (previously known and named as test procedure ASTM E96-66-Procedure BW). These standard test procedures are used to determine the water vapor transmission rate (WVTR) of a membrane, and use an assembly based on a water-impermeable cup (i.e. a "Thwing-Albert Vapometer"). The water-impermeable cup contains water to a level about nineteen millimeters below the top of the cup (specifically, 19 mim.+−0.6 mm). The opening of the cup is sealed watertight with a water-permeable membrane of the test material to be measured, leaving an air gap between the water surface and the membrane. In procedure BW, the cup is then inverted so that water is in direct contact with the membrane under test. The apparatus is placed in a test chamber at a controlled temperature and humidity, and air is then blown across the outside of the membrane at a specified velocity. Experiments are run in duplicate. The weights of the cups, water and membrane assemblies are measured over several days and results are averaged. The rate at which water vapor permeates through the membrane is quoted as the "water transmission vapor rate", measured as the average weight loss of the assembly at a given membrane thickness, temperature, humidity and air velocity, as expressed as mass loss per unit membrane surface area and time. The WVTR of membranes or films according to ASTM E96-95-Procedure BW is typically measured on a film of thickness twenty five microns and at an air flow rate of three meters per second (3 ms.sup.−1), air temperature twenty three degrees Celsius (23.degree. C.) and fifty percent (50%) relative humidity.

It will, of course, be appreciated that the above description has been given by way of example only and that modifications in detail may be made within the scope of the present invention. For example, whilst the preferred embodiment of FIG. 1 is specifically described in relation to a two-cylinder car engine, the air intake system could be employed to supply any engine. Indeed, the location of the humidity augmenting non-porous membrane can be at one of a number of alternative positions within the engine, including at any stage before or after and air filter, at a point after the fuel-air mixture is formed in an inlet manifold or even in the cylinder itself.

Clearly, the use of a non-porous hydrophilic membrane is most preferred since its inherent nature limits the passage of water vapor into the inlet system, while not suffering from any clogging by dirt or debris because it is not porous. Moreover, a non-porous hydrophilic membrane guarantees that this part of the air induction system is hermetically sealed from the water source, which will therefore not be affected by the normal operating range of air pressure within the air induction system during the operation of the engine.

The invention claimed is:

1. A fuel cell comprising a humidifying gas induction or supply system having a non-porous hydrophilic membrane, wherein said non-porous hydrophilic membrane has at least two faces; the first face being in contact with a hydrogen gas stream and the second face being in contact with wet exhaust air wherein said non-porous hydrophilic membrane absorbs liquid water from the wet exhaust air and transports water molecules across the non-porous hydrophilic membrane surface so as to emerge into the hydrogen gas stream as water vapor.

2. The fuel cell according to claim 1 having at least a second non-porous hydrophilic membrane, the second non-porous hydrophilic membrane having at least two faces; the first face being in contact with the hydrogen gas stream and the second face being in contact with a container of liquid water, wherein said non-porous hydrophilic membrane absorbs liquid water from the container and transports water molecules across the second non-porous hydrophilic membrane so as to emerge into the hydrogen gas stream as water vapor.

3. The fuel cell according to claim 1 having at least a third non-porous hydrophilic membrane having at least two faces; the first face being in contact with an air or oxygen gas stream and the second face being in contact with wet exhaust air wherein said non-porous hydrophilic membrane surface absorbs liquid water from the wet exhaust air and transports water molecules across said third non-porous hydrophilic membrane so as to emerge into the air or oxygen gas stream as water vapor.

4. The fuel cell according to claim 2 having at least a third non-porous hydrophilic membrane, said third non-porous hydrophilic membrane having at least two faces; the first face being in contact with an air or oxygen gas stream and the second face being in contact with wet exhaust air wherein said non-porous hydrophilic membrane absorbs liquid water from the wet exhaust air and transports water molecules across said third non-porous hydrophilic membrane so as to emerge into the air or oxygen gas stream as water vapor.

5. The fuel cell according to claim 3 having at least a fourth non-porous hydrophilic membrane, said fourth non-porous hydrophilic membrane having at least two faces; the first face being in contact with the air or oxygen gas stream and the second face being in contact with a container of liquid water wherein said non-porous hydrophilic membrane absorbs liquid water from the wet exhaust air and transports water molecules across the fourth non-porous hydrophilic membrane from the container of liquid water so as to emerge into the air or oxygen gas stream as water vapor.

6. The fuel cell according to claim 4 having at least a fourth non-porous hydrophilic membrane, said fourth non-porous hydrophilic membrane having at least two faces; the first face being in contact with the air or oxygen gas stream and the second face being in contact with a container of liquid water wherein said non-porous hydrophilic membrane absorbs liquid water from the wet exhaust air and transports water molecules across the fourth non-porous hydrophilic membrane from the container of liquid water so as to emerge into the air or oxygen gas stream.

7. The fuel cell according to claim 1, wherein there is a vapor pressure gradient across said first face and said second face of said non-porous hydrophilic membrane, such that liquid water is absorbed by said second face and water molecules are transported through and out of said first face.

8. The fuel cell according to claim 2, wherein there is a vapor pressure gradient across said first face and said second face of said non-porous hydrophilic membrane, such that liquid water is absorbed by said second face and water molecules are transported through and out of said first face.

9. The fuel cell according to claim 3, wherein there is a vapor pressure gradient across said first face and said second face of said non-porous hydrophilic membrane, such that liquid water is absorbed by said second face and water molecules are transported through and out of said first face.

10. The fuel cell according to claim 5, wherein there is a vapor pressure gradient across said first face and said second face of said non-porous hydrophilic membrane, such that liquid water is absorbed by said second face and water molecules are transported through and out of said first face.

* * * * *